(12) United States Patent
Williams et al.

(10) Patent No.: US 10,332,083 B2
(45) Date of Patent: Jun. 25, 2019

(54) SYSTEM AND METHOD PROVIDING IMPROVED USER EXPERIENCE IN A FUEL DISPENSING ENVIRONMENT

(71) Applicant: Gilbarco Inc., Greensboro, NC (US)

(72) Inventors: Rodger K. Williams, Siler City, NC (US); Robert P. Hoffman, Greensboro, NC (US); Giovanni Carapelli, High Point, NC (US); Edward A. Payne, Greensboro, NC (US)

(73) Assignee: Gilbarco Inc., Greensboro, NC (US)

( * ) Notice: Subject to any disclaimer, the term of this patent is extended or adjusted under 35 U.S.C. 154(b) by 323 days.

(21) Appl. No.: 14/510,874

(22) Filed: Oct. 9, 2014

(65) Prior Publication Data
US 2015/0106196 A1    Apr. 16, 2015

Related U.S. Application Data

(60) Provisional application No. 61/889,431, filed on Oct. 10, 2013.

(51) Int. Cl.
*G06Q 20/32* (2012.01)
*G06Q 20/14* (2012.01)
(Continued)

(52) U.S. Cl.
CPC ......... *G06Q 20/145* (2013.01); *G06Q 20/227* (2013.01); *G06Q 20/3274* (2013.01);
(Continued)

(58) Field of Classification Search
CPC ....... G06Q 20/32; G06Q 20/145; G06Q 50/06
See application file for complete search history.

(56) References Cited

U.S. PATENT DOCUMENTS

| 4,967,366 A * | 10/1990 | Kaehler | G06Q 50/06 235/381 |
| 5,689,071 A | 11/1997 | Ruffner et al. | |

(Continued)

FOREIGN PATENT DOCUMENTS

| CN | 102696048 A | 9/2012 |
| CN | 103038789 A | 4/2013 |

(Continued)

OTHER PUBLICATIONS

Smart Card Alliance. "Contactless Payment and the Retail Point of Sale: Applications, Technologies and Transaction Models" [online]. Dated Mar. 2003. Retrieved on Nov. 10, 2012 (Nov. 10, 2012). Retrieved from the Internet at URL: <http://www.it.iitb.ac.in/~tijo/seminar/Contactless_Pmt_Report.pdf>, all enclosed pages cited.

(Continued)

*Primary Examiner* — Peter Ludwig
*Assistant Examiner* — James H Miller
(74) *Attorney, Agent, or Firm* — Nelson Mullins Riley & Scarborough, LLP (57) ABSTRACT

A method of performing a fueling transaction via an application installed on a mobile device, such as a smart phone. One step of the method involves receiving at the mobile device a short range wireless initiation signal directly from a fuel dispenser. The wireless initiation signal contains information indentifying the fuel dispenser. In response to the wireless initiation signal, an application is automatically launched on the mobile device. Input is received into the mobile device from a customer, which is interpreted by the application to correspond to at least one selection made by the customer. Payment information of the customer is transmitted from the mobile device to a remote cloud server so that the transaction can be authorized. As fuel is dispensed from the fuel dispenser, at least one of fueling information (Continued)

and promotional information is received at the mobile device.

22 Claims, 10 Drawing Sheets

(51) Int. Cl.
    *G06Q 30/02*     (2012.01)
    *G06Q 20/22*     (2012.01)
    *G06Q 20/38*     (2012.01)
    *G07F 13/02*     (2006.01)

(52) U.S. Cl.
    CPC ....... *G06Q 20/3278* (2013.01); *G06Q 20/387* (2013.01); *G06Q 30/0253* (2013.01); *G06Q 30/0267* (2013.01); *G07F 13/025* (2013.01)

(56) References Cited

U.S. PATENT DOCUMENTS

| | | | |
|---|---|---|---|
| 5,734,851 A * | 3/1998 | Leatherman | G07F 9/02 |
| | | | 348/E7.085 |
| 5,859,416 A | 1/1999 | Gatto | |
| 5,923,572 A | 7/1999 | Pollock | |
| 5,956,259 A * | 9/1999 | Hartsell, Jr. | B67D 7/0401 |
| | | | 700/282 |
| 6,052,629 A | 4/2000 | Leatherman et al. | |
| 6,073,840 A * | 6/2000 | Marion | B67D 7/067 |
| | | | 235/381 |
| 6,089,284 A * | 7/2000 | Kaehler | G06Q 50/06 |
| | | | 141/2 |
| 6,098,879 A | 8/2000 | Terranova | |
| 6,116,505 A | 9/2000 | Withrow | |
| 6,152,591 A | 11/2000 | McCall et al. | |
| 6,176,421 B1 | 1/2001 | Royal, Jr. et al. | |
| 6,360,138 B1 | 3/2002 | Coppola et al. | |
| 6,364,206 B1 | 4/2002 | Keohane | |
| 6,422,464 B1 * | 7/2002 | Terranova | B67D 7/067 |
| | | | 235/380 |
| 6,435,204 B2 | 8/2002 | White et al. | |
| 6,442,448 B1 | 8/2002 | Finley et al. | |
| 6,704,774 B2 | 3/2004 | Terranova | |
| 6,741,909 B2 | 5/2004 | Leatherman et al. | |
| 6,769,607 B1 | 8/2004 | Pitroda et al. | |
| 6,813,609 B2 | 11/2004 | Wilson | |
| 6,882,900 B1 | 4/2005 | Terranova | |
| 6,935,191 B2 | 8/2005 | Olivier et al. | |
| 7,031,945 B1 | 4/2006 | Donner | |
| 7,039,389 B2 | 5/2006 | Johnson, Jr. | |
| 7,255,264 B2 | 8/2007 | de Leon | |
| 7,280,087 B2 | 10/2007 | Williams et al. | |
| 7,289,877 B2 | 10/2007 | Wilson | |
| 7,408,758 B2 | 8/2008 | Myers et al. | |
| 7,523,770 B2 * | 4/2009 | Horowitz | G06Q 50/30 |
| | | | 141/104 |
| 7,546,251 B1 | 6/2009 | Leatherman et al. | |
| 7,562,813 B2 | 7/2009 | Humphries et al. | |
| 7,574,377 B2 | 8/2009 | Carapelli | |
| 7,607,576 B2 | 10/2009 | Robertson et al. | |
| 7,664,885 B2 | 2/2010 | Carapelli | |
| 7,774,231 B2 | 8/2010 | Pond et al. | |
| 8,009,032 B2 | 8/2011 | Long et al. | |
| 8,032,414 B2 | 10/2011 | Payne et al. | |
| 8,342,407 B2 | 1/2013 | Williams et al. | |
| 8,386,322 B2 | 2/2013 | Williams et al. | |
| 8,433,441 B2 * | 4/2013 | Oldham | B67D 7/145 |
| | | | 700/231 |
| 8,577,734 B2 | 11/2013 | Treyz et al. | |
| 8,666,542 B2 | 3/2014 | Durham et al. | |
| 8,786,272 B2 * | 7/2014 | Carapelli | G07F 7/088 |
| | | | 324/71.1 |
| 8,897,708 B2 | 11/2014 | Witkowski et al. | |
| 8,925,808 B2 | 1/2015 | Harrell | |
| 8,939,361 B2 | 1/2015 | Stoudt et al. | |
| 8,983,137 B2 | 3/2015 | Hradetzky | |
| 9,047,596 B2 | 6/2015 | Williams et al. | |
| 9,053,503 B2 | 6/2015 | Carapelli | |
| 9,153,088 B2 * | 10/2015 | Spencer, II | G06Q 20/327 |
| 9,458,004 B2 | 10/2016 | Schluze | |
| 9,972,159 B2 * | 5/2018 | Carapelli | G06Q 20/18 |
| 2002/0113082 A1 * | 8/2002 | Leatherman | B67D 7/067 |
| | | | 222/52 |
| 2003/0200008 A1 | 10/2003 | Wilson | |
| 2003/0200108 A1 | 10/2003 | Malnoe | |
| 2004/0030601 A1 | 2/2004 | Pond et al. | |
| 2004/0050648 A1 | 3/2004 | Carapelli | |
| 2004/0182921 A1 | 9/2004 | Dickson et al. | |
| 2004/0254861 A1 | 12/2004 | Pentel | |
| 2005/0000974 A1 * | 1/2005 | Chirnomas | G07F 5/18 |
| | | | 221/9 |
| 2005/0029358 A1 | 2/2005 | Mankins | |
| 2005/0085226 A1 | 4/2005 | Zalewski et al. | |
| 2005/0184145 A1 | 8/2005 | Law et al. | |
| 2005/0184155 A1 | 8/2005 | Pinkus | |
| 2005/0192832 A1 * | 9/2005 | Call | G06Q 10/00 |
| | | | 235/381 |
| 2006/0266822 A1 | 11/2006 | Kelley et al. | |
| 2007/0022058 A1 | 1/2007 | Labrou et al. | |
| 2007/0057038 A1 | 3/2007 | Gannon | |
| 2007/0152035 A1 | 7/2007 | Adams et al. | |
| 2007/0156436 A1 | 7/2007 | Fisher et al. | |
| 2007/0190939 A1 | 8/2007 | Abel | |
| 2008/0040287 A1 | 2/2008 | Harrell et al. | |
| 2008/0154735 A1 | 6/2008 | Carlson | |
| 2008/0191878 A1 * | 8/2008 | Abraham | G06Q 20/12 |
| | | | 340/572.1 |
| 2008/0248815 A1 | 10/2008 | Busch | |
| 2008/0308628 A1 | 12/2008 | Payne et al. | |
| 2009/0048708 A1 | 2/2009 | Deline | |
| 2009/0048710 A1 | 2/2009 | DeLine | |
| 2009/0084840 A1 | 4/2009 | Williams et al. | |
| 2009/0129403 A1 | 5/2009 | Harrell et al. | |
| 2009/0259590 A1 | 10/2009 | Carapelli | |
| 2009/0265638 A1 | 10/2009 | Carapelli et al. | |
| 2010/0051689 A1 | 3/2010 | Diamond | |
| 2010/0133335 A1 | 6/2010 | Maguid et al. | |
| 2010/0268612 A1 | 10/2010 | Berrio et al. | |
| 2011/0057790 A1 | 3/2011 | Martin et al. | |
| 2011/0112866 A1 | 5/2011 | Gerrans | |
| 2011/0169729 A1 * | 7/2011 | Holleis | G06F 3/0346 |
| | | | 345/156 |
| 2011/0185319 A1 | 7/2011 | Carapelli | |
| 2013/0054315 A1 | 2/2013 | Shutter | |
| 2013/0103585 A1 * | 4/2013 | Carapelli | G06Q 20/202 |
| | | | 705/44 |
| 2013/0121428 A1 | 5/2013 | Carapelli et al. | |
| 2013/0232019 A1 | 9/2013 | Frieden et al. | |
| 2013/0246171 A1 * | 9/2013 | Carapelli | G06Q 20/3278 |
| | | | 705/14.51 |
| 2014/0006188 A1 * | 1/2014 | Grigg | G06Q 20/20 |
| | | | 705/17 |
| 2014/0074714 A1 * | 3/2014 | Melone | G06Q 20/322 |
| | | | 705/44 |
| 2014/0089174 A1 | 3/2014 | Carapelli et al. | |
| 2014/0114473 A1 | 4/2014 | McNinch | |
| 2014/0152526 A1 * | 6/2014 | Greig | H01Q 1/40 |
| | | | 343/866 |
| 2014/0172157 A1 * | 6/2014 | Bellamy, III | G07F 11/002 |
| | | | 700/232 |
| 2014/0351138 A1 * | 11/2014 | Frieden | G06Q 20/325 |
| | | | 705/44 |
| 2015/0032558 A1 | 1/2015 | Bonk et al. | |
| 2015/0105920 A1 * | 4/2015 | Carapelli | G07F 13/025 |
| | | | 700/283 |
| 2015/0120476 A1 | 4/2015 | Harrell | |
| 2015/0142588 A1 | 5/2015 | Hum et al. | |
| 2015/0143116 A1 | 5/2015 | Tang et al. | |
| 2015/0144653 A1 * | 5/2015 | Kline | B67D 1/0888 |
| | | | 222/1 |

(56) References Cited

U.S. PATENT DOCUMENTS

FOREIGN PATENT DOCUMENTS

| CN | 107248068 A | * | 10/2017 | ............. G06Q 20/10 |
|---|---|---|---|---|
| EP | 1681778 A2 | | 7/2006 | |
| EP | 1804475 A3 | | 4/2014 | |
| WO | 2012004771 A1 | | 1/2012 | |
| WO | 2013040169 A1 | | 3/2013 | |

OTHER PUBLICATIONS

International Search Report and Written Opinion dated Nov. 27, 2012 (Nov. 27, 2012), PCT Application No. PCT/US2012/055098, International Filing Date Sep. 13, 2012 (Sep. 13, 2012), all enclosed pages cited.
International Search Report and Written Opinion dated Jan. 26, 2015 (Jan. 26, 2015), PCT Application No. PCT/US2014/060132, International Filing Date Oct. 10, 2014 (Oct. 10, 2014), all enclosed pages cited.
International Search Report and Written Opinion dated Jan. 29, 2015 (Jan. 29, 2015), corresponding PCT Application No. PCT/US2014/060049, International Filing Date Oct. 10, 2014 (Oct. 10, 2014), all enclosed pages cited.
Extended Search Report dated April 12, 2017 in corresponding European patent application No. 14851584.4, all enclosed pages cited.
Non-Final Office Action dated Apr. 12, 2017 in co-pending U.S. Appl. No. 14/511,993, all enclosed pages cited.
Final Office Action dated Nov. 16, 2017 in corresponding U.S. Appl. No. 14/511,993, all enclosed pages cited.
Office Action dated Aug. 30, 2017 in corresponding Mexican patent application serial No. MX/a/2016/004550, all enclosed pages cited.
Office Action dated Oct. 31, 2017 in corresponding Eurasian Patent Convention patent application No. 201690727, all enclosed pages cited.
Office Action dated Sep. 5, 2017 in corresponding Mexican patent application No. MX/a/2016/004549, all enclosed pages cited.
Office Action dated Oct. 31, 2017 in corresponding Eurasian Patent Convention patent application No. 201690729, all enclosed pages cited.
Examination Report dated Oct. 4, 2018 in corresponding European patent application serial No. 14851584.4, all enclosed pages cited.
Official Notification dated Jul. 31, 2018 in corresponding Eurasian regional patent application serial No. 201690729, all enclosed pages cited.
Office Action dated Nov. 19, 2018 in corresponding Chinese patent application serial No. 201480063328.6, all enclosed pages cited.
Extended Search Report dated Feb. 15, 2017 in co-pending European patent application No. 14851893.9, all enclosed pages cited.
Chinese Office Action dated Feb. 5, 2018 in co-pending patent application serial No. 201480066938.1, all enclosed pages cited.
Examination Report dated Mar. 12, 2018 in corresponding European patent application No. 14851584.4, all enclosed pages cited.
Examination Report dated Mar. 13, 2018 in co-pending European patent application No. 14851893.9, all enclosed pages cited.
Office Action dated Apr. 12, 2018 in co-pending Mexican patent application No. MX/a/2016/004549, all enclosed pages cited.
Office Action dated May 2, 2018 in co-pending Mexican patent application No. MX/a/2016/004550, all enclosed pages cited.
Official Notification dated Jun. 27, 2018 in corresponding Eurasian patent application No. 201690727, all enclosed pages cited.

* cited by examiner

SYSTEM AND METHOD PROVIDING IMPROVED USER EXPERIENCE IN A FUEL DISPENSING ENVIRONMENT

PRIORITY CLAIM

This application is based upon and claims the benefit of U.S. provisional application Ser. No. 61/889,431, filed Oct. 10, 2013, which is incorporated fully herein for all purposes.

FIELD OF THE INVENTION

The present invention relates generally to service stations at which fuel is dispensed. More particularly, the present invention relates to interaction between a fuel dispenser and a customer's mobile phone or other portable mobile device to provide improvements in the customer's user experience at the service station.

BACKGROUND

Transaction processing within a retail fueling environment conventionally includes interaction between a customer and a fuel dispenser. The customer typically presses certain keys on a user interface provided on the fuel dispenser to provide input for a transaction. Output is provided to the customer in response by the user interface (typically via a visual display). The customer obtains payment authorization for the transaction by swiping a credit card at the fuel dispenser (also referred to as "pay at the pump") or communicating with an employee situated at a point of sale (POS) terminal. After authorization is received, the customer dispenses fuel and interacts with the user interface of the fuel dispenser to complete the transaction. An example of such a fuel dispenser interface is the card reader in dispenser (CRIND®) equipped fuel dispenser manufactured by Gilbarco Inc.

There have been efforts to effect payment for various goods and services via mobile devices such as cell phones. Because initial technology was based on proprietary messaging through cell phone networks, "payment roaming" was not possible. Alternative techniques, like that described in U.S. Pub. App. No. 2004/0050648 (incorporated herein in its entirety by reference for all purposes), describe Internet-based payment using a mobile phone able to connect to the internet and a vending machine ("VM") also connected to the internet. In this regard, at least one action is first taken by the customer to identify the vending machine. For example, the '648 application discloses the concept of a "unique VM identification number," which the customer keys in on the phone. A central server, connected to both the phone and the VM, acts as clearinghouse and establishes a "virtual connection" between the phone and the VM.

With such a system, the VM identification number needs to be visible on the VM, either in the form of a physical placard or an image dynamically displayed on a digital display that is integrated on the VM. In the latter case, the code can be changed for each transaction, thus providing a unique coupling between customer and device to make the transaction more secure. An alternative way to transfer the VM identification number to a phone is via a bar code (such as a QR code) that also could be dynamically generated and rendered on the VM's display. The bar code would be imaged via a camera integrated into the customer's phone.

Both the manual input of a numeric code and the QR snapshot have certain limitations. In the first case, the number must be short enough to make a manual input reasonable, but this tends to reduce security and number of devices on the network. In the case of QR code with photo camera, the lighting conditions and the actual visibility of the QR code might make an effective, reliable application problematic.

SUMMARY OF CERTAIN ASPECTS

The present invention recognizes and addresses the foregoing considerations, and others, of prior art construction and methods. In this regard, certain exemplary and nonlimiting aspects of the present invention will now be described. These aspects are intended to provide some context for certain principles associated with the present invention, but are not intended to be defining of the full scope of the present invention.

Certain aspects of the present invention are directed to a system for providing an enhanced user experience for a customer at a fuel dispenser, vending machine or other payment terminal. Examples of retail fueling environments, fuel dispensers, and user interfaces for fuel dispensers are provided in U.S. Pat. No. 6,435,204 (entitled "Fuel Dispensing System"), U.S. Pat. No. 5,956,259 (entitled "Intelligent Fueling"), U.S. Pat. No. 5,734,851 (entitled "Multimedia Video/Graphics in Fuel Dispensers"), U.S. Pat. No. 6,052,629 (entitled "Internet Capable Browser Dispenser Architecture"), U.S. Pat. No. 5,689,071 (entitled "Wide Range, High Accuracy Flow Meter"), U.S. Pat. No. 6,935,191 (entitled "Fuel Dispenser Fuel Flow Meter Device, System and Method"), U.S. Pat. No. 7,289,877 (entitled "Fuel Dispensing System for Cash Customers") and U.S. Pat. No. 7,774,231 (entitled "Electronic Payment Methods for a Mobile Device") and U.S. published patent application nos. 20090048710 (entitled "Fuel Dispenser"), 20100268612 (entitled "Payment Processing System for Use in a Retail Environment Having Segmented Architecture"), and 20110185319 (entitled "Virtual PIN Pad for Fuel Payment Systems"). The entire disclosure of each of the foregoing patents and applications is hereby incorporated by reference as if set forth verbatim herein for all purposes.

The present invention provides elements and method steps that facilitate or enhance a fueling transaction. In accordance with one aspect, a customer initiates a fueling transaction by tapping a suitably-equipped mobile device (e.g., smart phone) with an NFC tag attached to or near the fuel dispenser. For example, the NFC tag may comprise an adhesive-backed sticker attached to the fuel dispenser's housing. The tag contains information instructing the mobile device to open an app installed thereon (or, if not installed, directing to the mobile device to an internet location from which the app can be obtained). With the app thus running, the customer may authorize the transaction. After the transaction is completed, it can be settled to a default credit card, or chosen by the customer at the time of the transaction. Use of the app can also ensures that loyalty discounts are applied automatically to the transaction, or that the customer automatically receives loyalty credit. In addition, any fueling preferences (such as a transaction limit or fuel grade) may also be applied without further action by the user.

Some aspects of the present invention contemplate retrofitting existing fuel dispensers to utilize mobile payment transactions. For example, an active sniffer may be installed between the pump electronics and existing forecourt controller to intercept messages flowing therebetween. The sniffer may also communicate with a remote (e.g., internet-based) server using suitable internet connectivity (e.g., over legacy cable connectivity). Once a mobile device having mobile payment capability is detected in proximity to the dispenser, a transaction can be initiated. The sniffer receives pump control messages from the remote server and provides them to the pump electronics in the appropriate format. After the transaction is complete, the sniffer may provide transaction information to the local point of sale system for logging and reconciliation purposes.

Different systems and methods of the present invention utilize various combinations of the disclosed elements and method steps as supported by the overall disclosure herein. Thus, combinations of elements other than those discussed above may be claimed. Moreover, the accompanying drawings, which are incorporated in and constitute a part of this specification, illustrate one or more embodiments of the invention and, together with the description, serve to explain the principles of the invention.

BRIEF DESCRIPTION OF THE DRAWINGS

A full and enabling disclosure of the present invention, including the best mode thereof directed to one of ordinary skill in the art, is set forth in the specification, which makes reference to the appended drawings, in which.

Repeat use of reference characters in the present specification and drawings is intended to represent same or analogous features or elements of the invention.

DETAILED DESCRIPTION OF PREFERRED EMBODIMENTS

Reference will now be made in detail to presently preferred embodiments of the invention, one or more examples of which are illustrated in the accompanying drawings. Each example is provided by way of explanation of the invention, not limitation of the invention. In fact, it will be apparent to those skilled in the art that modifications and variations can be made in the present invention without departing from the scope or spirit thereof. For instance, features illustrated or described as part of one embodiment may be used on another embodiment to yield a still further embodiment. Thus, it is intended that the present invention covers such modifications and variations as come within the scope of the appended claims and their equivalents.

Figure 1:
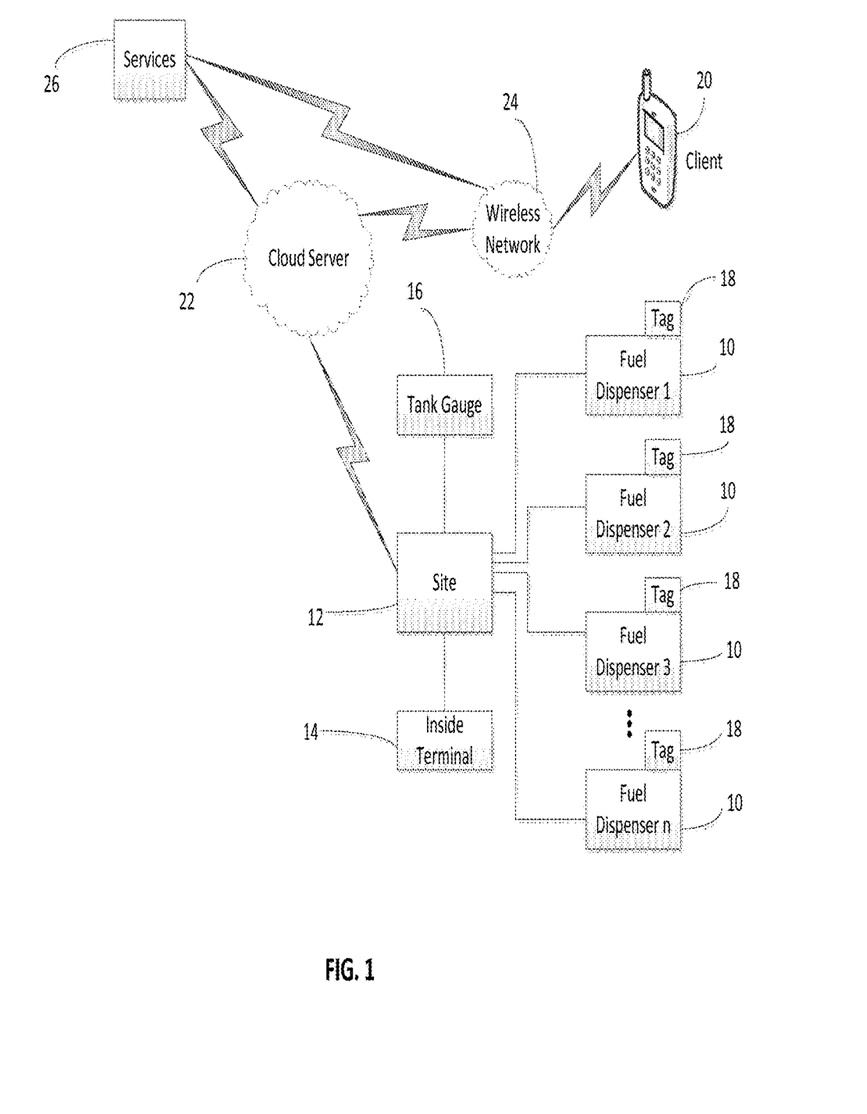
FIG. 1 is a diagrammatic representation of a retail fueling environment incorporating certain aspects of the present invention.

FIG. 1 illustrates a fuel dispensing environment having a plurality of fuel dispensers 10. The fuel dispensing environment will typically include a central building having a convenience store ("C-store") and also housing a POS system, forecourt controller, electronic payment server, and/or other devices to control fueling transactions. Such devices are collectively represented in this illustration as site 12. One or more inside terminals 14, which may comprise card readers and PIN pads, will also typically be provided. A tank gauge 16, used to monitor inventory in underground storage tanks containing fuel for the fuel dispensing environment, may also communicate with site 12.

Each of the fuel dispensers 10 may preferably be equipped with one or more NFC tags 18. For example, the NFC tags may be similar to common RFID tags used for inventory control purposes in retail stores. In accordance with a preferred embodiment, such tags may be embodied as simple stickers having an embedded passive-response antenna. Such antennae use the energy imparted to them by an electromagnetic interrogation to produce a response. The stickers may have the service station's logo imprinted thereon, as well as appropriate verbiage such as "Tap phone here." As will be explained more fully below, tags 18 will simplify the customer's interaction with the fuel dispenser in a manner that enhances the customer's overall experience during the fueling transaction. The use of a passive-response antenna eliminates the need to provide a separate power source as is generally required at NFC terminals.

The customer's cell phone 20 (also referred to as the "client") is used to initiate a fueling transaction. Typically, cell phone 20 may be a "smart phone" capable of running multiple and/or downloadable apps, such as those sold by Apple, Motorola, Samsung, HTC and others. Moreover, while a cell phone is one example of a wireless communication (mobile) device that may be used with embodiments of the present invention, other types of mobile devices may also be used for this purpose. For example, certain embodiments of the present invention may utilize various tablet computers.

In accordance with the illustrated embodiment, detection of a tag 18 by phone 20 initiates the fuel dispensing transaction. As will be explained more fully below, an interface is preferably generated on the display of phone 20 with which the customer can interact. For example, the customer may choose a method of payment (rather than swiping a credit card at the dispenser) and indicate any limits on the transaction (such as $20). The interface may also be used to make other selections related to the transaction, such as fuel grade to be dispensed. Preferably, these preferences (e.g., fuel grade) may be stored as defaults so the customer does not need to choose them manually in subsequent transactions, unless a change is desired. If the customer is enrolled in a loyalty program, loyalty points may be accrued automatically without the need to swipe or scan a separate loyalty card. In addition, a receipt can be automatically sent to phone 20 at the conclusion of the transaction.

Referring again to FIG. 1, phone 20 communicates with a cloud server 22 via a wireless network 24 such as the digital cellular network (or local wifi). Cloud server 22 is also in communication with the respective fuel dispensers 10, either directly or via site 12 as shown. As one skilled in the art will appreciate, cloud server 22 may actually be a series of separate physical devices that communicate with each other via WAN or LAN. Advantageously, the scale of cloud server 22 can be easily adjusted as needed depending on anticipated volume of data. Various services 26, explained more fully below, communicate with site 12 and/or phone 20 via cloud server 22. In some embodiments, it is contemplated that services 26 may communicate with phone 20 directly through wireless network 24, perhaps after a "hand-off" from cloud server 22.

Figure 2:
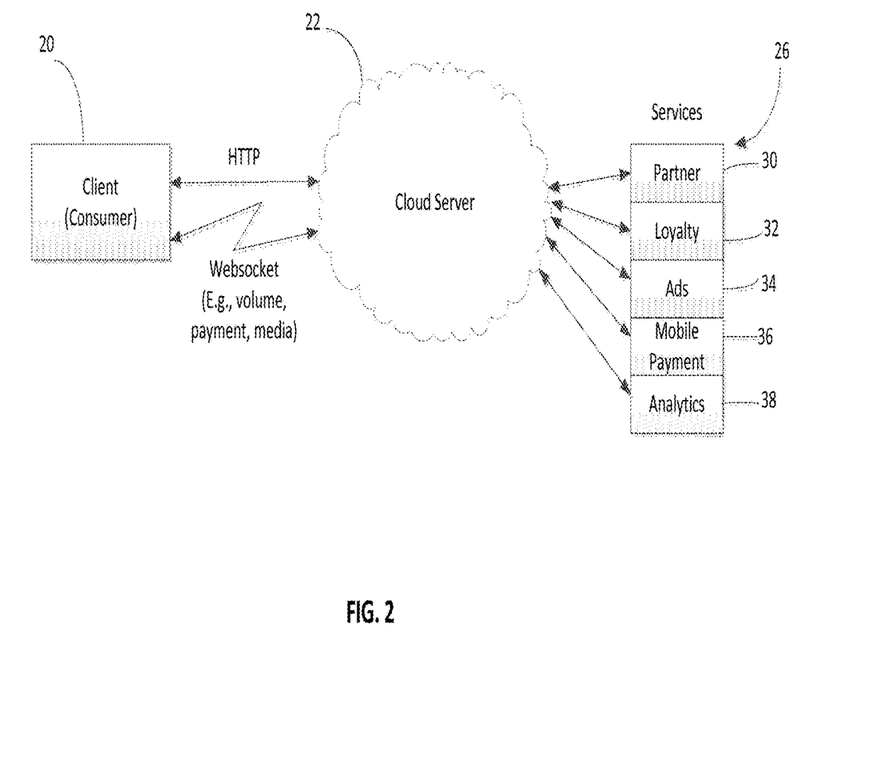
FIG. 2 is a more detailed diagrammatic representation of a portion of the system illustrated in FIG. 1.

Referring now to FIG. 2, certain additional details of a system in accordance with the present invention may be more easily described. As can seen, client 20 is in communication with one or more services 26 via cloud server 22. It is contemplated that the communication will begin when the customer brings phone 20 in the immediate vicinity of a tag 18. In a preferred embodiment, the communication between phone 20 and cloud server 22 begins as HTTP, but then switches to an encrypted full duplex communication once communication is established. For example, websocket or java message service (JMS) communication may be used for this purpose. In the illustrated embodiment, websocket communication is utilized to provide transfer of information between client 20 and cloud server 22. Such information may include payment information, information about the volume and/or monetary amount of fuel dispensed, and advertising or other media. It will be appreciated that websocket communication allows cloud server 22 to push content to client 20 as necessary or desired.

Collectively grouped under the heading "services" are resources that may be used to effect the fueling transaction, or enhance the customer's experience in various ways. For example, a media partner 30 that has a business relationship with the service station (or third party operator of cloud server 22) may provide media content to phone 20 (or to the display on fuel dispenser 10) during the fueling transaction. A loyalty server 32 may validate the customer's loyalty status, and keep track of any rewards that are due. For example, customers with higher levels of rewards may be entitled to an immediate fuel discount.

Promotions, such as coupons or advertisements, may be provided during the fueling transaction (either to phone 20 or the display of fuel dispenser 10) by ad server 34. For example, the ads may be inserted into commercial breaks or banners in the media from partner 20. In addition to ads promoting products or services of the service station, third party ads may also be provided. In the case of third party ads, it may be appropriate to provide the service station operator with a portion of the revenue generated by placement of the ads. In some implementations, the customer may be enticed to watch the ad by an instantaneous discount on the price of fuel. For example, a price per unit (PPU) discount (e.g., 31T per gallon) may be offered in exchange for an agreement to view one or more ads during the fueling transaction. If the customers "accepts" the discount (such as by clicking a "button" on the smart phone screen), the per unit price of the fuel might immediately change. Fueling will proceed at the new price assuming the ad is allowed to play on the customer's phone. Preferably, the app on the phone may be able to detect if the ad was closed before completion, in which case the PPU of the fuel may revert to its original value. Alternatively, the transaction can simply stop when the ad is prematurely closed.

Payment is authorized and completed via the payment network 36. In addition, detailed information about transactions occurring across multiple service stations can be collected and processed by analytics server 38. This information may be useful to tailor products and/or services to better suit customer buying preferences or sales patterns, or to facilitate maintenance. It will be appreciated that the entity which collects and analyzes this data may charge a service fee to the service station operators for access to it.

Figure 3:
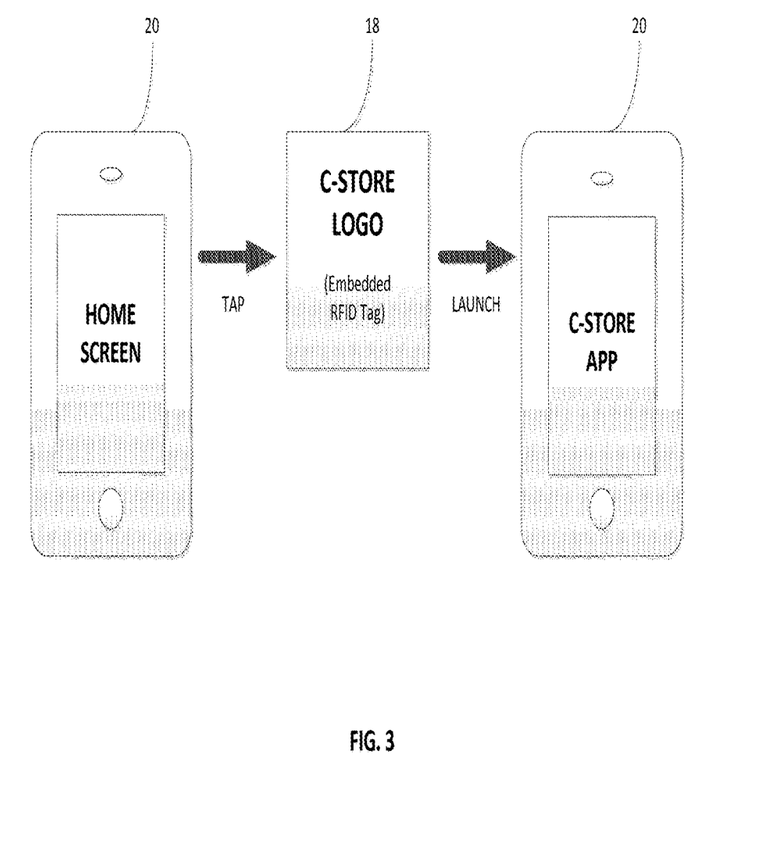
FIG. 3 is a diagrammatic representation of a smart phone being placed adjacent to an NFC tag located on a fuel dispenser (or an attendant handheld) in accordance with an embodiment of the present invention.

FIG. 3 illustrates phone 20 in association with tag 18 at the beginning of a transaction. As noted above, phone 20 is preferably a smart phone equipped with NFC capability. Many newer smart phones already have NFC, and many more are expected to have NFC in the future. When tag 18 is "tapped" with phone 20, a response is produced by the tag. The response will generally include information necessary to identify the particular dispenser that the customer wishes to use as well as information directing phone 20 to cloud server 22. As a result, websocket communication between phone 20 and cloud server 22 can be established.

In particular, the response from tag 18 preferably causes an app to be launched on phone 20 which serves as an interface for the transaction. In other words, as shown in FIG. 3, phone 20 may show its "home screen" before tag 18 is tapped. After tag 18 is tapped, the transaction app ("C-store app") may be automatically launched based on instructions received from tag 18. Payment can occur via a default credit card set by the customer, or the form of payment (i.e., particular credit card) may be selected by the customer via the app. The customer's loyalty account may be credited or debited automatically, and promotional messages or coupons may be sent to the mobile device. If applicable, the coupons can be used immediately, or they can be stored on the mobile device for later use by the customer. In "attended markets" where an attendant individual dispenses the fuel and uses a wireless handheld device to control the fuel dispenser, tag 18 may be located on the housing of the handheld.

Figure 4:
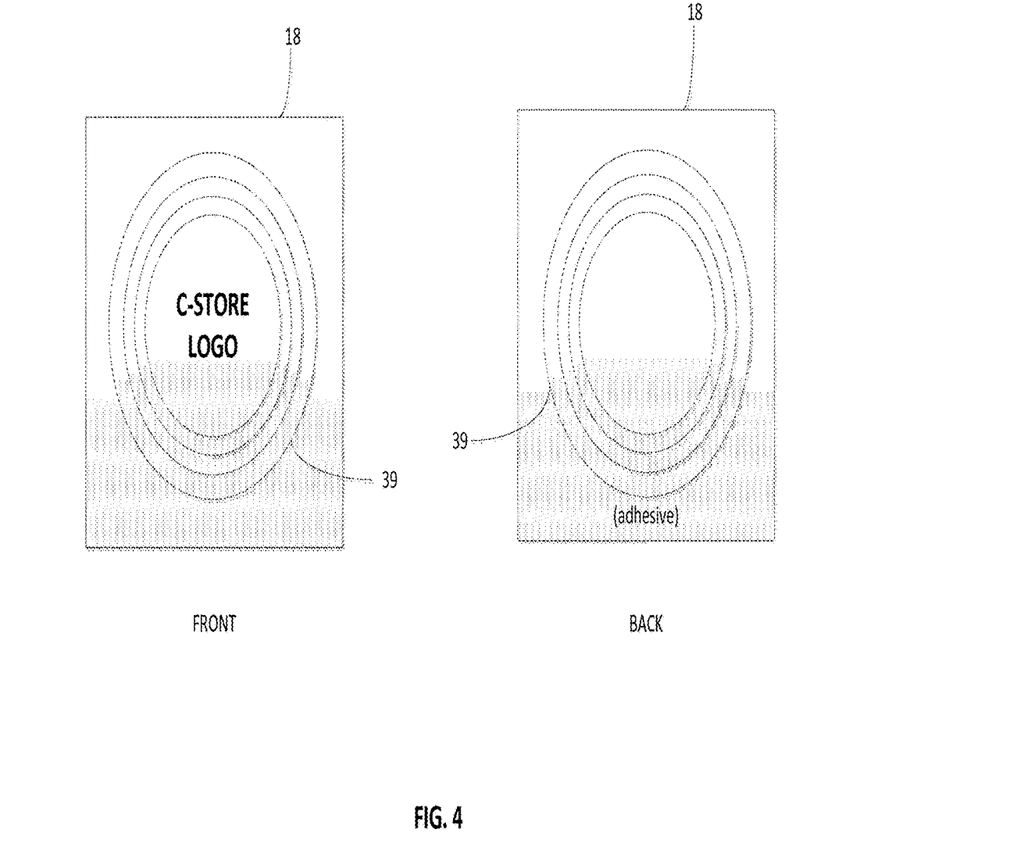
FIG. 4 diagrammatically illustrates front and back views of an exemplary NFC tag that may be used in embodiments of the present invention.

Referring now to FIG. 4, front and back sides of exemplary tag 18 are illustrated. As described above, the front side of tag 18 may desirably display the store's logo, or any other promotional or informational message that the store wishes to display. The back of tag 18 may be coated with an adhesive by which it can be attached to the fuel dispenser housing or other appropriate surface. Preferably, the adhesive will be covered and protected by a common release liner until the time that the tag is attached to a surface. The embedded antenna 39 is diagrammatically represented in this illustration as a plurality of concentric circles. One or more low-cost microchips and other electronic components may also be embedded in tag 18 so as to be in electrical communication with antenna 39.

Figure 5:
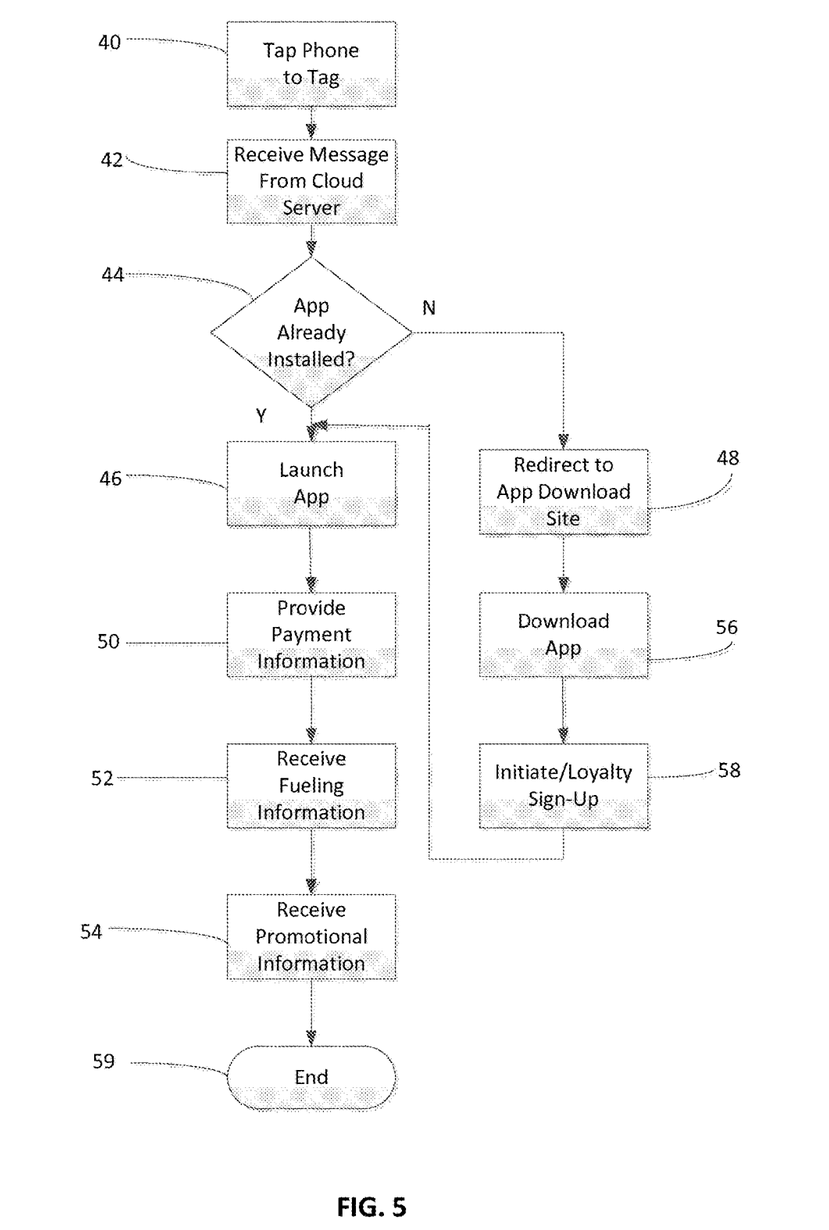
FIG. 5 is a flow chart showing exemplary process steps occurring at a smart phone in accordance with an embodiment of the present invention.
Figure 6:
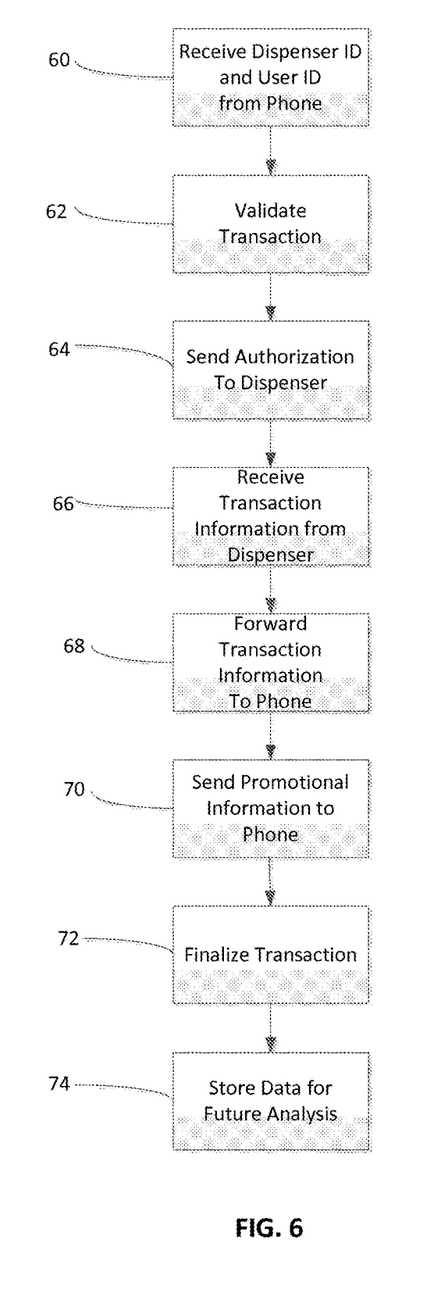
FIG. 6 is a flow chart showing exemplary process steps occurring at a cloud server in accordance with an embodiment of the present invention.
Figure 7:
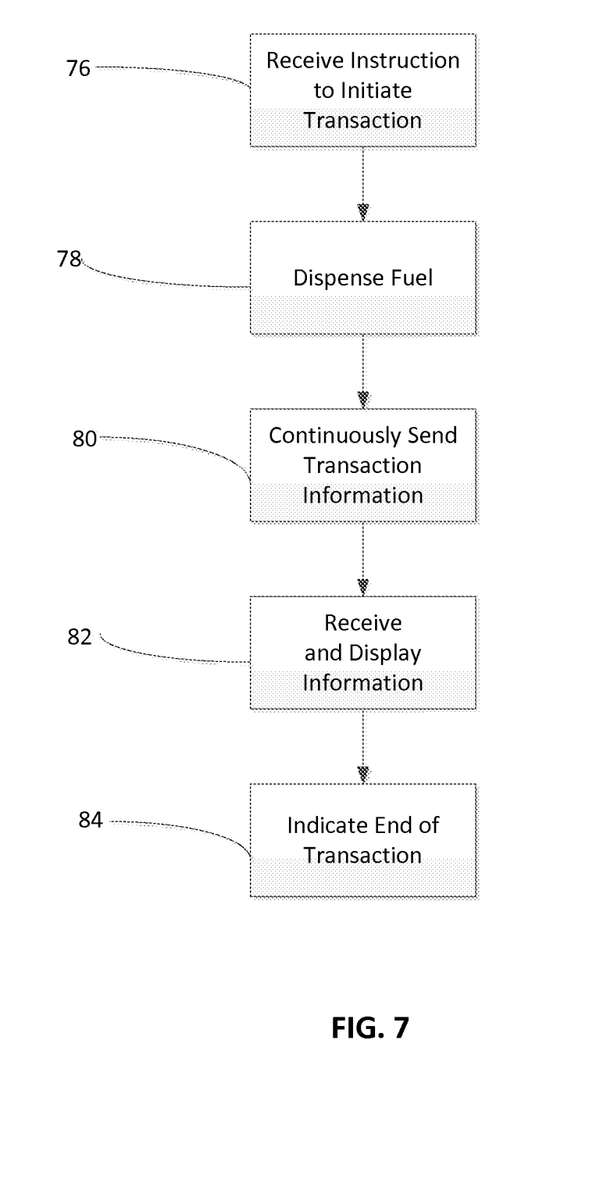
FIG. 7 is a flow chart showing exemplary process steps occurring at a fuel dispenser or other payment terminal in accordance with an embodiment of the present invention.

FIGS. 5 through 7 illustrate exemplary methodology that may occur in accordance with an embodiment of the present invention at phone 20, cloud server 22, and fuel dispenser 10, respectively. Referring first to FIG. 5, a customer brings phone 20 into proximity with tag 18 (as indicated at 40) at the beginning of a transaction. A message is received at the phone 20 (as indicated at step 42) inquiring whether the appropriate app is installed on the phone. (The message may come from cloud server 22 or directly from tag 18, depending on the embodiment.) As indicated at 44, it is determined whether the app is already installed on phone 20. If so, as indicated at 46, the app is launched on the phone. If not, as indicated at 48, the phone's web browser is directed to a site from which the app can be downloaded. Also, upon confirming an NFC tap, the user phone number may be sent to the NFC tap capture server for location verification and tracking of the mobile device.

Assuming the app was previously installed on phone 30, the customer may be prompted by the app to enter a PIN code into the phone. If the PIN code is authentic, the app may prompt the user to select a desired method of payment, unless the system is configured to use only a default method of payment. Payment information for the transaction is then provided, as indicated at 50. The payment information may often comprise the actual payment card account number, or information sufficient to identify a previously-stored account number. The cell phone app may display real time transaction information as the transaction is in progress (as indicated at 52). For example, the phone may show the monetary and/or volume total on a real-time basis as fuel is being dispensed. During the transaction, coupons or promotional messages may be received at the phone 20 (as indicated at 54).

As noted above, the customer may be directed to a site from which the app can be obtained if it is not already installed on phone 20. Assuming the customer wants to install the app, it can then be downloaded to phone 20, as indicated at 56. Typically, as indicated at 58, the customer will then be prompted to automatically enroll in the service station's loyalty program. This process may involve granting permissions to the loyalty provider or service for personal information such as email address, name, cell phone number, and/or payment methods that may already be available on the mobile device. Alternatively, the customer may promoted to manually enter all of this information, although automatic permissions and information transfer will often be the preferred default method. The process then continues as previously described, and ends at the conclusion of the transaction (as indicated at 59).

FIG. 6 shows method steps that may occur at cloud server 22. As indicated at 60, information regarding the customer and fuel dispenser ID are received from phone 20 after it has been brought into close proximity with tag 18. Payment information may also be received from the phone, which, as indicated at 62, is used to validate the transaction. Authorization for the transaction may then be forwarded to fuel dispenser 10, as indicated at 64. Transaction information received from the fuel dispenser during the fueling transaction (as indicated at 66) may be forwarded to phone 20 as the transaction progresses (as indicated at 68). During the transaction, coupons and various other promotional messages may be sent to phone 20 (as indicated at 70). Once dispensing is completed, the transaction is finalized as indicated at 72. The transaction data may be stored for future analysis, as indicated at 74.

Referring now to FIG. 7, steps that may occur at the fuel dispenser or other payment terminal will now be described. As indicated at 76, the dispenser receives a request (authorization) to initiate a transaction. During the period in which fuel is dispensed by the customer (as indicated at 78), transaction information (i.e., volume and monetary total) may be sent to cloud server 22 on a continuous basis (as indicated at 80). In addition, various information, such as promotional information or a mirror of the customer's smart phone display, may be received and displayed at the fuel dispenser (as indicated at 82). Once the transaction is complete, an indication thereof is sent to cloud server 22 (as indicated at 84) so that the customer's payment method can be charged for the correct total.

Figure 8:
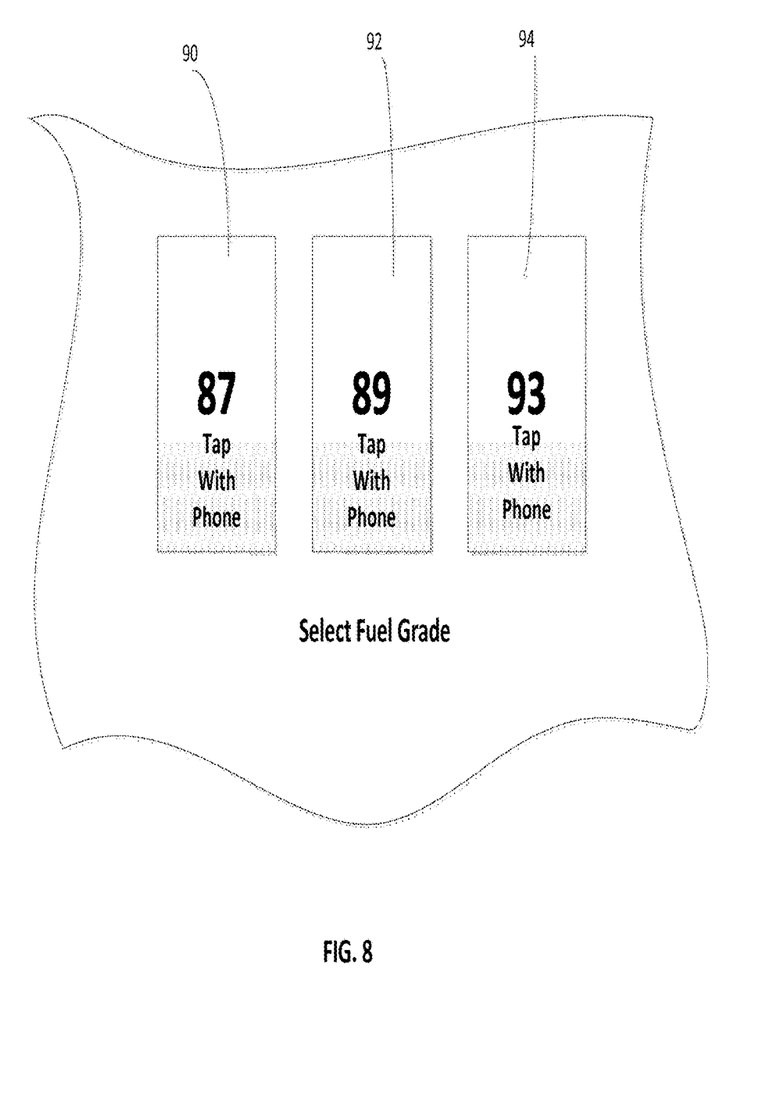
FIG. 8 is a diagrammatic representation showing NFC tags used in lieu of fuel grade select buttons in accordance with an aspect of the present invention.

NFC tags such as tag 18 or other proximity indicia may be used in conjunction with a mobile device to effect various additional functions of a fuel dispenser. For example, current fuel dispensers include multiple buttons by which a customer selects the fuel grade and/or type to be dispensed. In this regard, a typical gasoline dispenser may allow the customer to select 87, 89, or 93 octane. In accordance with the present invention, stickers comprising a passive-response antenna may be applied to the surface of each such button. Thus, as an alternative to pressing the fuel grade button, the customer may simply bring phone 20 into proximity with the grade button. In fact, if suitably equipped smart phones are sufficiently ubiquitous, the buttons themselves could be eliminated in view respective tags. This is illustrated in FIG. 8, wherein three NFC tags 90, 92, and 94 corresponding to respective grades of fuel are located on the front surface of a fuel dispenser. The customer selects the desired grade by simply tapping the associated tag.

NFC tags as described above may be used in other ways to enhance the customer's transaction experience. For example, if the customer is inside a convenience store (or other retail location) and wishes to pay a cashier, an NFC tag at the cashier terminal may be tapped in order to automatically generate an optical code (e.g., QR code) on the display of the smart screen. The optical code can be scanned by the store's POS system in order to extract the payment information. The code can also contain loyalty and/or coupon information, allowing the customer to receive an immediate discount for the purchase (or at least to accrue loyalty credits more easily). NFC tags corresponding to various products may be located at the shelf where the respective products are displayed. As the customer removes product from the shelf, the corresponding NFC tag can be tapped with the customer's smart phone. This allows the phone to keep a running tally of the products being purchased to facilitate check-out and payment at the register.

Figure 9:
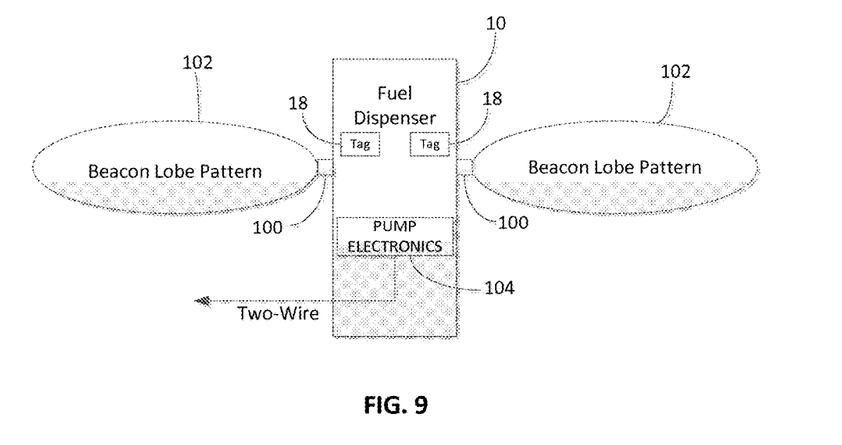
FIG. 9 is a diagrammatic representation of a fuel dispenser equipped with low power Bluetooth "beacons" on respective sides thereof in accordance with an embodiment of the present invention.

Referring now to FIG. 9, certain additional aspects of the present invention will be explained. As can be seen, fuel dispenser 10 is in this case equipped with respective "beacons" 100 on the two sides from which fuel can be dispensed. It is contemplated that various radio frequency transceivers may be used as beacons 100, although many preferred embodiments may utilize Bluetooth low-energy (BLE) transceivers. Many newer phones are compatible with BLE, which has a shorter range than Bluetooth, and may not require pairing between components. As indicated at 102, beacons 100 are configured to have a relatively narrow radiation lobe pattern extending away from the respective sides of dispenser 100. The customer's phone would need to be located within the lobe pattern in order for communication to be established.

The app used to receive and verify the signal from beacon 100 will typically be downloaded to phone 20 from a website accessed by the phone's web browser. In this regard, tags 18 may be located on each side of the dispenser to facilitate download of the app. In particular, if the customer does not already have the app, the respective tag 18 is simply tapped with phone 20 to immediately bring up the correct website on the phone's display.

Depending on the embodiment, beacons 100 may be unidirectional or bidirectional. A unidirectional beacon will typically broadcast dispenser identification (ID) and perhaps other information or commands that can be used to facilitate a transaction. In this case, communication with the cloud server will typically occur via the digital phone network. On the other hand, if the beacon is capable of bidirectional communication and dispenser 10 is internet-enabled, phone 20 may send information to the cloud server through dispenser 10. This may be advantageous in areas where cell phone service is lacking or inconsistent.

Thousands of existing fuel dispensers utilize traditional two-wire protocol to exchange transaction information with the forecourt controller and point-of-sale (POS) system located in the convenience store. Two-wire communication is suitable for many purposes, but its low frequency limits the speed of data transfer. Thus, efforts have recently been made to utilize legacy wiring to provide high bandwidth communications, such as video advertising, to the forecourt dispensers. One such system is disclosed in U.S. Pub. App. No. 2013/0121428 ("the '428 application"), incorporated herein by reference in its entirety for all purposes.

Figure 10:
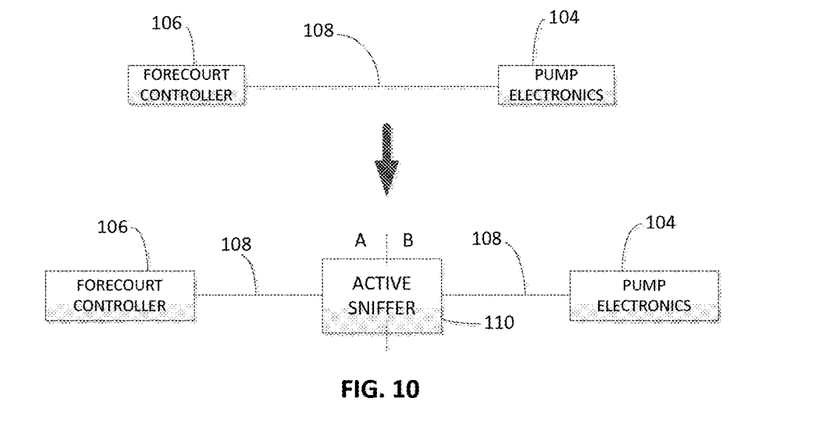
FIG. 10 is a diagrammatic representation showing installation of a sniffer device between electronics inside the pump and a forecourt controller in accordance with an embodiment of the present invention.

In this regard, aspects of the present invention may be incorporated into new dispensers at the time of manufacture, or may be added to existing dispensers as a retrofit. In the case of a retrofit, certain modifications may be necessary or desirable in order to provide a satisfactory level of functionality. Referring now to FIG. 10, the top diagram shows pump electronics 104 of an existing dispenser in electrical communication with the site's forecourt controller 106 over two-wire legacy cable 108. Forecourt controller 106 receives requests to initiate a transaction from pump electronics 104 and instructs pump electronics 104 to allow dispensing of fuel after the transaction has been authorized. When dispensing of fuel has been finalized, pump electronics 104 provides information on the volume and monetary amount of the dispensed fuel back to forecourt controller 106 so that the transaction can be finalized.

In accordance with the present invention, the existing dispenser may be modified to provide additional functionality to enhance a customer's transaction experience. Toward this end, the bottom diagram in FIG. 10 shows the installation of an "active sniffer" 110 along cable 108. Specifically, cable 108 is severed at an intermediate location between pump electronics 104 and forecourt controller 106 at which active sniffer 110 is connected. As one skilled in the art will appreciate, active sniffer 110 is an electronic device that intercepts messages appearing along cable 108 on either its "A" side or "B" side. Sniffer 108 includes a suitably-programmed processor (and associated memory) that determines whether the message should be passed along to the other side, or not. In some cases, sniffer 108 may substitute a different message for the one that was received, or provide a response that emulates a certain condition. This is in contrast to a passive sniffer, which would merely detect the messages flowing between pump electronics 104 and forecourt controller 106.

Figure 11:
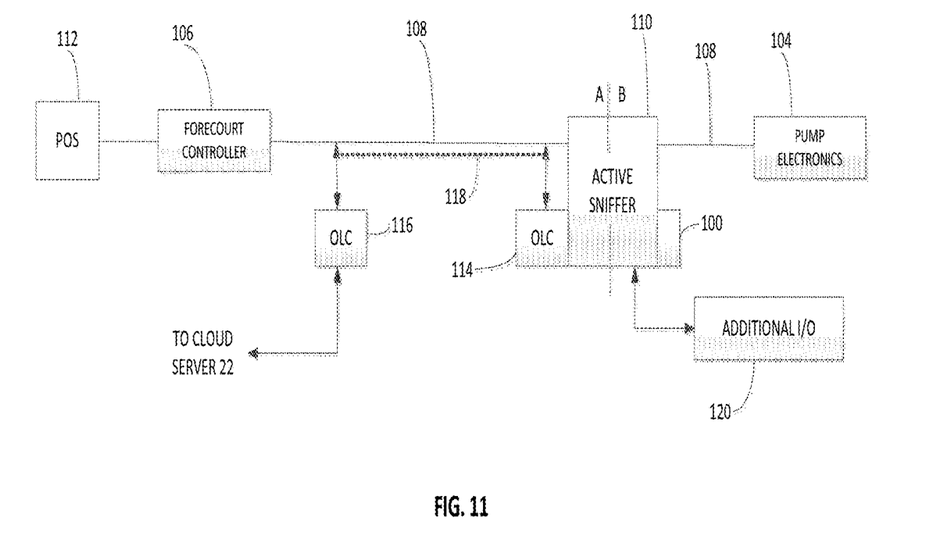
FIG. 11 is a diagrammatic representation showing an example of how such a sniffer can be used to retrofit an existing fuel dispenser to have mobile payment capability.

Referring now to FIG. 11, use of active sniffer 110 in accordance with one preferred implementation will be described. As noted above, sniffer 110 receives messages from pump electronics 104 and forecourt controller 106 on its "B" and "A" sides, respectively. The messages can be immediately passed to the other side, delayed, modified, or not passed at all. In addition, sniffer 110 can provide a message to the sending component emulating a response, or otherwise providing information to the sending component that is useful to achieve the desired functionality. For example, assuming the dispenser is engaged in a mobile transaction, sniffer 110 can provide details of the transaction in a manner that can be logged by the store's point-of-sale (POS) system 112. This may be responsive to a standard status request issued by forecourt controller 106 on a periodic (e.g., polling) basis. One skilled in the art will appreciate that software running on forecourt controller 106 and/or POS 112 may need to be upgraded to recognize these new messages, or else the store operator may need to obtain the mobile sales information manually by logging in to the cloud server.

To achieve desirable levels of functionality, sniffer 110 (and thus existing dispenser 10) is preferably adapted to access cloud server 22 over an internet connection. This may be accomplished by various techniques, such as wifi or running an Ethernet cable out to the dispenser under the services station's forecourt. In many cases, however, it will be desirable to provide the internet connection using legacy cable 108, such as using DSL or HomePlug techniques. In this regard, a first over legacy cable (OLC) modem 114 may be connected to a suitable port of sniffer 110. A second OLC modem 116 is located away from fuel dispenser 10, such as inside the convenience store. As indicated at 118, high bandwidth network communications are transmitted on cable 108 along with the lower frequency two-wire signals transmitted to and from forecourt controller 106. Modem 116 is connected to a suitable router or gateway that provides communication with cloud server 22.

In the illustrated embodiment, one or more beacons 100 are also connected to sniffer 100 via suitable ports. For example, the beacons may be configured as Bluetooth BLE dongles attached to USB ports on sniffer 110. As a result, the customer is able to conduct a fueling transaction using either the dispenser's existing user interface (card reader, PIN pad, etc.) or the mobile payment functionality provided by the retrofit arrangement. Of course, it will be appreciated that sniffer 110 and its associated components may be incorporated directly in pump electronics 104 in fuel dispensers to be built. In this alternative, OLC modem 114 would allow the future dispenser to replace an existing dispenser without the arduous task of replacing the legacy two-wire cable already in place under the service station's forecourt with new Ethernet cable.

As a further alternative, it may not be necessary in attended markets to equip the dispenser with OLC modem 114. Instead, the attendant's handheld can be configured as a mobile "hotspot" which communicates with the fuel dispenser via bidirectional beacon 100, wifi, or the like. In this case, the dispenser will rely on the handheld's internet connection to provide the desired functionality to the dispenser.

Referring again to FIG. 11, a mobile transaction may be initiated when the customer's phone receives dispenser identification information from beacon 100. The app installed on the phone provides payment information (and preferably also loyalty information) to cloud server 22. This may be accomplished via the digital cell phone network, or using the dispenser's internet connection if bidirectional communication occurs at beacon 100. Once the transaction is authorized, cloud server 22 instructs pump electronics 104 to allow fueling to begin. During this time, sniffer 110 may provide suitable messages to forecourt controller 106 indicating that a mobile payment transaction is in progress (e.g., "Dispenser Enabled By Remote Cloud Payment Controller") or, if forecourt controller 106 is not programmed to understand this message, simply that the dispenser 10 is "Idle." Either way, it will be appreciated that the mobile payment transaction is authorized and is controlled independently of forecourt controller 106 and POS 112. This independent control provides various operational advantages and enhanced functionality while also providing backward compatibility. For example, transaction information for analytical purposes can be obtained directly from the dispenser without the need to interface with POS 112 (which may have been supplied by any one of many vendors).

After dispensing is completed, pump electronics 104 provide information regarding the volume and monetary amount of the fuel that was dispensed. This signal is intercepted by sniffer 110, and the requisite information is provided to cloud server 22 in order to finalize the transaction. Assuming forecourt controller 106 and POS 112 have been suitably programmed, sniffer 110 may send a signal after the transaction is finalized which allows POS 112 to log the transaction (e.g., "Delivered 12.4 Gallons by Mobile Payment. Transaction ID is 42BH0124."). If the existing site equipment is not equipped to understand this message, the service station operator can obtain the same information manually by logging in to cloud server 22. Of course, the manual log-in may be less desirable because it would likely make inventory reconciliation more difficult.

The internet connection of sniffer 110 can provide existing dispenser 10 with additional new functionality unrelated to payment. This new functionality is diagrammatically represented in FIG. 11 as Additional I/O 120. For example, various sensors, cameras or other devices that are useful to detect fraud occurring at the dispenser may communicate with cloud server 22 via sniffer 110. In addition, cloud control of the dispenser may allow various maintenance functions to be achieved by remote control. These might include, for example, remote reboot, remote calibration, or remote changing of dispenser parameters. As an example, technicians are generally required under current practice to open the dispenser's cabinet and physically connect a laptop computer or the like to the dispenser's internal electronics in order to change metrological settings. Active sniffer 110 could allow the technician to make these changes using a smart phone or tablet computer that is not physically connected to the dispenser, assuming an appropriate validation protocol is implemented to prevent fraud.

One skilled in the art will appreciate that various methodologies described in U.S. Pub. No. 2013/0246171 ("the '171 application") may be practiced according to the techniques discussed herein. Accordingly, the '171 application is incorporated herein by reference in its entirety for all purposes.

While one or more preferred embodiments of the invention have been described above, it should be understood that any and all equivalent realizations of the present invention are included within the scope and spirit thereof. While much of the discussion above has involved fuel as the exemplary product being dispensed, one skilled in the art will recognize that aspects of the present invention are applicable to a wide variety of different goods and services. Thus, the embodiments depicted are presented by way of example only and are not intended as limitations upon the present invention. For example, many aspects of the present invention are described above in the exemplary context of a retail fueling environment. It should be understood by those of ordinary skill in this art, however, that the present invention is not limited to these embodiments because other commercial environments are contemplated and modifications can be made. For example, an optically-read indicia (such as a QR code) may be used instead of an NFC tag in accordance with some embodiments. Or, the information otherwise provided by tag 18 may be sent to the smart phone via Bluetooth, Zigbee, or the like. Therefore, it is contemplated that any and all such embodiments are included in the present invention as may fall within the scope and spirit thereof.

What is claimed is:

1. A fuel dispensing system comprising:
    a fuel dispenser comprising a passive near-field communication transponder which is operative to emit a wireless initiation signal when interrogated by a mobile device of a customer, the wireless initiation signal containing information identifying the fuel dispenser;
    an active sniffer comprising
        a first communication connection in communication with a forecourt controller;
        a second communication connection in communication with pump electronics of the fuel dispenser, wherein the first communication connection and the second communication connection are disposed along a fueling environment legacy cable;
        a third communication connection with a cloud server; and
        a processor and a memory including computer program code, the memory and the computer programing code configured to, with the processor, cause the apparatus active sniffer to:
            receive an authorized transaction message from the cloud server in response to the cloud server authorizing the transaction based on receiving information identifying the fuel dispenser and payment information of the customer from the mobile device;
            instruct the pump electronics to allow fueling based on receipt of the authorized transaction message; and
            provide a message to the forecourt controller indicative of a mobile payment transaction in progress, such that the mobile payment transaction is authorized and controlled independently of the forecourt controller.

2. The fuel dispensing system of claim 1, wherein memory and the computer program code are further configured to, with processor, cause the active sniffer to:
    receive information regarding the volume or monetary amount of the fuel dispensed from the pump electronics;
    transmit the information regarding the volume or monetary amount to the cloud server to finalize the mobile payment transaction.

3. The fuel dispensing system of claim 1, wherein memory and the computer program code are further configured to, with processor, cause the active sniffer to:
    in response to finalization of the mobile payment transaction, transmit a signal to the forecourt controller to cause a point of sale (POS) device to log the transaction.

4. The fueling dispensing system of claim 1, wherein the fuel dispenser further comprises a plurality of near field communication transponders operative to emit a signal when interrogated and which correspond to the information identifying the fuel dispenser and an associated grade of fuel of a plurality of fuel grades.

5. The fueling dispensing system of claim 4, wherein each of the plurality of passive near field communication transponders for each grade of fuel is affixed to a corresponding grade select button on the fuel dispenser.

6. The fuel dispensing system of claim 1, wherein the passive near field communication transponder comprises an antenna arrangement and associated circuitry carried on an adhesive backed tag attached to a housing of the fuel dispenser.

7. The fuel dispensing system as set forth in claim 1, wherein the passive near field communication transponder displays indicia visually indicating an associated fuel grade.

8. A fuel dispensing system comprising:
- a fuel dispenser having a short range beacon which is operative to emit a wireless initiation signal when interrogated by a mobile device of a customer, wherein the wireless interrogation signal comprises information identifying the fuel dispenser;
- an active sniffer comprising
  - a first communication connection in communication with a forecourt controller;
  - a second communication connection in communication with pump electronics of the fuel dispenser, wherein the first communication connection and the second communication connection are disposed along a fueling system legacy cable;
  - a third communication connection with a cloud server; and
  - a processor and a memory including computer program code, the memory and the computer programing code configured to, with the processor, cause the apparatus active sniffer to:
    - receive an authorized transaction message from the cloud server in response to the cloud server authorizing the transaction based on receiving information identifying the fuel dispenser and payment information of the customer from the mobile device;
    - instruct the pump electronics to allow fueling based on receipt of the authorized transaction message; and
    - provide a message to the forecourt controller indicative of a mobile payment transaction in progress, such that the mobile payment transaction is authorized and controlled independently of the forecourt controller.

9. The fuel dispensing system of claim 8, wherein memory and the computer program code are further configured to, with processor, cause the active sniffer to:
- receive information regarding the volume or monetary amount of the fuel dispensed from the pump electronics;
- transmit the information regarding the volume or monetary amount to the cloud server to finalize the mobile payment transaction.

10. The fuel dispensing system of claim 8, wherein memory and the computer program code are further configured to, with processor, cause the active sniffer to:
- in response to finalization of the mobile payment transaction, transmit a signal to the forecourt controller to cause a point of sale (POS) device to log the transaction.

11. The fuel dispensing system of claim 8, wherein the initiation signal is emitted from the beacon as a Bluetooth low-energy signal.

12. The fuel dispensing system of claim 8, wherein the beacon provides bidirectional communication directly with the mobile device via a Bluetooth low-energy protocol.

13. A method of effecting a fueling transaction in a fueling system comprising:
- transmitting a short range wireless initiation signal from a fuel dispenser to a mobile device, wherein the initiation signal comprises information identifying the fuel dispenser;
- receiving an authorized transaction message, at an active sniffer, from the cloud server in response to the cloud server authorizing the transaction based on receiving information identifying the fuel dispenser and payment information of the customer from the mobile device, wherein the active sniffer comprises a first communication connection in communication with a forecourt controller, a second communication connection in communication with pump electronics of the fuel dispenser, and a third communication connection with a cloud server, wherein the first communication connection and the second communication connection are disposed along a fueling system legacy cable;
- instructing the pump electronics, by the active sniffer, to allow fueling based on receipt of the authorized transaction message; and
- provide a message to the forecourt controller, from the active sniffer, indicative of a mobile payment transaction in progress, such that the mobile payment transaction is authorized and controlled independently of the forecourt controller.

14. The method of claim 13 further comprising:
- receiving, at the active sniffer, information regarding the volume or monetary amount of the fuel dispensed from the pump electronics;
- transmitting the information regarding the volume or monetary amount to the cloud server to finalize the mobile payment transaction.

15. The method of claim 14 further comprising:
- transmitting a signal, from the active sniffer to the forecourt controller, in response to finalization of the mobile payment transaction, to cause a point of sale (POS) device to log the transaction.

16. The method of claim 13, wherein the short range wireless initiation signal is received in response to an interrogation signal emitted from the mobile device.

17. The method of claim 16, wherein the short range wireless initiation signal is generated by a passive near-field communication (NFC) transponder associated with the dispenser.

18. The method of claim 13, wherein the short range wireless initiation signal is emitted by a short range beacon located at the fuel dispenser.

19. The method of claim 18, wherein the short range wireless initiation signal is a Bluetooth low-energy signal.

20. The method of claim 19, wherein communication between the mobile device and the fuel dispenser is bidirectional via the beacon.

21. The method of claim 13, wherein communication between the cloud server and the mobile device comprises encrypted full duplex communication.

22. The method of claim 13, wherein a fuel grade is selected via near-field communication (NFC) with one of a plurality of passive NFC transponders, each corresponding to a fuel grade of a plurality of fuel grades.

* * * * *